US012671446B2

(12) United States Patent     (10) Patent No.:    US 12,671,446 B2

Nakajima et al.             (45) Date of Patent:     Jun. 30, 2026

(54) RADIO-FREQUENCY MODULE AND COMMUNICATION DEVICE

(71) Applicant: Murata Manufacturing Co., Ltd., Nagaokakyo (JP)

(72) Inventors: Reiji Nakajima, Nagaokakyo (JP); Hiroyuki Kani, Nagaokakyo (JP); Morio Takeuchi, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 289 days.

(21) Appl. No.: 18/443,356

(22) Filed: Feb. 16, 2024

(65) Prior Publication Data

US 2024/0396575 A1     Nov. 28, 2024

(30) Foreign Application Priority Data

May 24, 2023    (JP) ................................ 2023-085681

(51) Int. Cl.
   H04B 1/00       (2006.01)
   H04B 1/04       (2006.01)

(52) U.S. Cl.
   CPC ......... H04B 1/0057 (2013.01); H04B 1/0078 (2013.01); H04B 1/04 (2013.01); *H04B 2001/0408* (2013.01)

(58) Field of Classification Search
   CPC ...... H04B 1/0057; H04B 1/0078; H04B 1/04; H04B 2001/0408; H04B 1/006
   See application file for complete search history.

(56) References Cited

U.S. PATENT DOCUMENTS

2021/0091807 A1*   3/2021   Shinozaki ............ H04B 1/0475
2021/0135693 A1*   5/2021   Horita ...................... H04B 1/18

* cited by examiner

*Primary Examiner* — Ayodeji O Ayotunde

(74) *Attorney, Agent, or Firm* — XSENSUS LLP

(57)         ABSTRACT

A radio-frequency module includes a module substrate having first and second major surfaces, a transmit filter disposed at the module substrate, a duplexer that is disposed at the module substrate and that includes a transmit filter and a receive filter, an antenna switch to selectively couple the transmit filter or the duplexer, and a switch to selectively couple the transmit filter or the transmit filter. The transmit filter has a pass band that includes an uplink operating band of a first band for frequency division duplex. The transmit filter has a pass band that includes the uplink operating band of the first band. The receive filter has a pass band that includes a downlink operating band of the first band. The transmit filter and the receive filter are stacked together and positioned beside the first major surface.

20 Claims, 6 Drawing Sheets

<PC2 MODE (ONLY TRANSMISSION IS ENABLED)>

<PC3 MODE (RECEPTION IS ALSO ENABLED)>

RADIO-FREQUENCY MODULE AND COMMUNICATION DEVICE

CROSS-REFERENCE TO RELATED APPLICATION

This application claims the benefit of priority to Japanese application no. 2023-085681, filed May 24, 2023, the entire contents of which are hereby incorporated by reference.

BACKGROUND

1. Field

The present disclosure relates to a radio-frequency module and a communication device.

2. Description of the Related Art

There is a concern that mobile communication devices, such as cellular phones, become larger with increasing numbers of components, particularly due to the development of multiband operation. The increase in size may be due to a front-end module that supports multiple bands.

SUMMARY

Because the known technology needs multiple filters, it is difficult to reduce the dimensions of the module. Additionally, when simultaneous signal transfer is enabled, the quality of signals may degrade due to insufficient isolation between the signals.

The present disclosure provides a radio-frequency module and a communication device that can improve signal quality while also achieving dimensional reduction.

A radio-frequency module according to an aspect of the present disclosure includes a module substrate including a first major surface and a second major surface that is opposite to the first major surface, a first acoustic wave filter disposed at the module substrate, a duplexer that is disposed at the module substrate and that includes a second acoustic wave filter and a third acoustic wave filter, an antenna switch configured to selectively couple the first acoustic wave filter or the duplexer, and a transmit switch configured to selectively couple the first acoustic wave filter or the second acoustic wave filter. The first acoustic wave filter has a pass band that includes an uplink operating band of a first band for frequency division duplex (FDD). The second acoustic wave filter has a pass band that includes the uplink operating band of the first band. The third acoustic wave filter has a pass band that includes a downlink operating band of the first band. The first acoustic wave filter and the third acoustic wave filter are stacked together and positioned beside the first major surface.

A communication device according to an aspect of the present disclosure includes the radio-frequency module according to an aspect of the present disclosure and a signal processing circuit configured to process a radio-frequency signal transferred or to be transferred through the radio-frequency module.

The present disclosure provides the radio-frequency module and the communication device that can improve signal quality while also achieving dimensional reduction.

DETAILED DESCRIPTION

Figure 1:
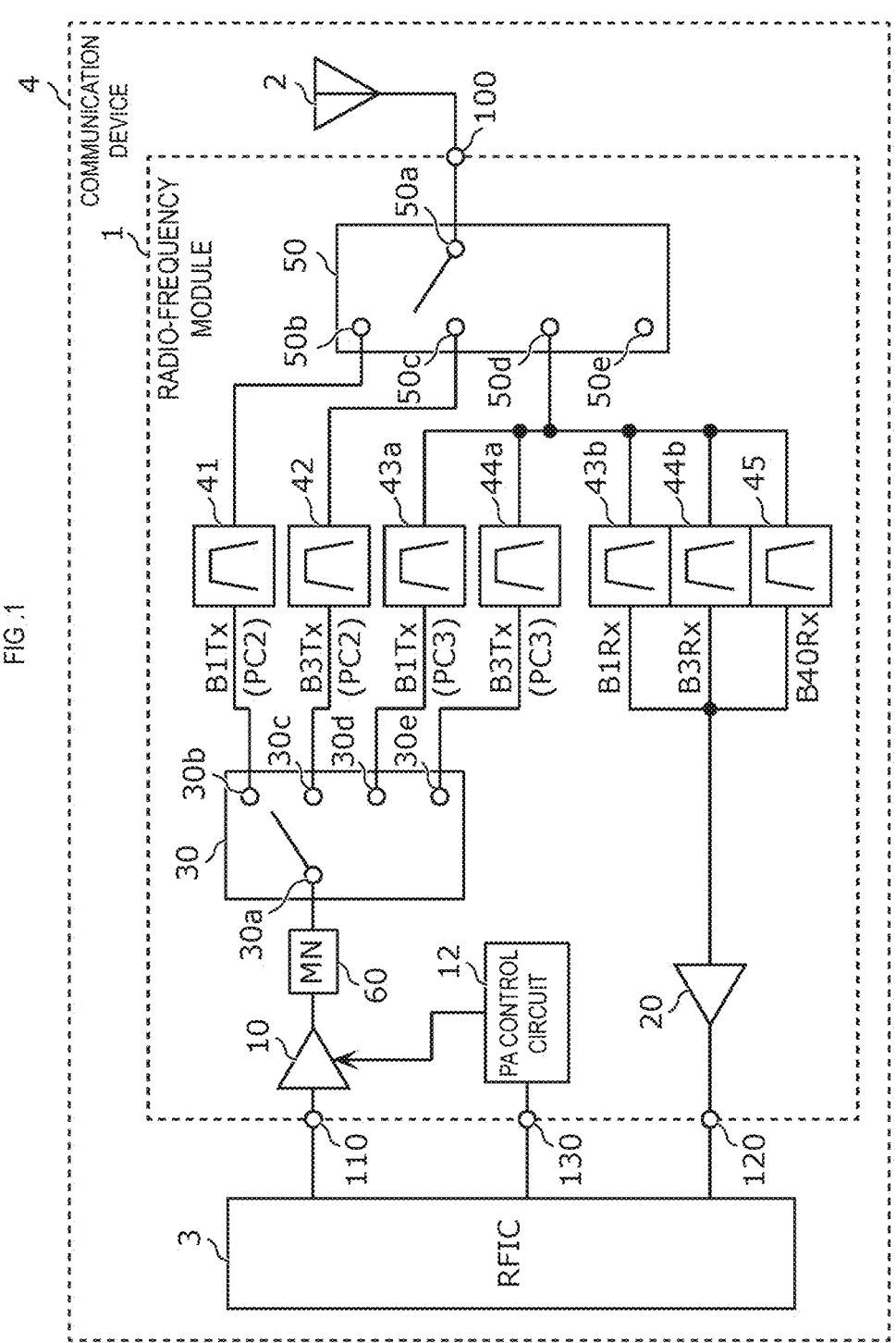
FIG. 1 is a circuit configuration diagram of a radio-frequency module and a communication device according to an exemplary embodiment.

Hereinafter, exemplary embodiments of the present disclosure will be described in detail with reference to the drawings. The exemplary embodiments described below represent comprehensive or specific examples. Details such as numerical values, shapes, materials, constituent elements, and arrangements and connection modes of the constituent elements provided in the following exemplary embodiments are illustrative and are not intended to limit the present disclosure.

The drawings are schematically illustrated with necessary emphasis, omissions, or proportion adjustments to depict the present and do not necessarily represent exact details; thus, the shapes, positional relationships, and proportions can differ from actual implementations. Identical reference numerals are assigned to substantially the same configuration elements across the drawings, and redundant descriptions of these configuration elements can be omitted or simplified.

In the drawings described later, the x-axis and the y-axis are perpendicular to each other in a plane parallel to the major surfaces of a substrate. Specifically, when the substrate is rectangular in plan view, the x-axis is parallel to a first side of the substrate, and the y-axis is parallel to a second side perpendicular to the first side of the substrate. The z-axis is perpendicular to the major surfaces of the substrate. Along the z-axis, the positive direction indicates upward, and the negative direction indicates downward.

In the component layouts of the present, the term "plan view of a substrate" refers to a situation in which an object is orthogonally projected on an xy-plane and viewed from the positive side of the z-axis. The expression "A overlaps B in plan view" refers to a situation in which at least a portion of the region of A orthogonally projected on an xy plane coincides with at least a portion of the region of B orthogonally projected on the xy plane. The expression "A is disposed between B and C" refers to a situation in which at least one of the line segments each connecting any given point within B to any given point within C passes through A.

In the component layouts of the present disclosure, the expression "a component is disposed at a substrate" applies when the component is disposed at a major surface of the substrate and also when the component is disposed inside the substrate. The expression "a component is disposed at a major surface of a substrate" applies when the component is disposed in contact with the major surface of the substrate and also when the component is disposed above the major surface without making contact with the major surface (for example, when the component is stacked on another component that is disposed in contact with the major surface). The expression "a component is disposed at a major surface of a substrate" may also apply when the component is disposed in a depressed portion formed at the major surface. The expression "a component is disposed inside a substrate" applies when the component is encapsulated in the module substrate; additionally, the expression applies when the component is entirely positioned between the two major surfaces of the substrate but not fully covered by the substrate and also applies when only a portion of the component is disposed inside the substrate.

In the circuit configurations of the present disclosure, the term "couple" applies when one circuit element is directly coupled to another circuit element via a connection terminal and/or an interconnect conductor, and the term also applies when one circuit element is electrically coupleable to another circuit element via still another circuit element. The term "coupled between A and B" refers to a situation in which one circuit element is coupled to both A and B while the circuit element is positioned between A and B.

As used in the present disclosure, the term "distance between A and B" refers to the shortest distance between A and B; specifically, the shortest distance between A and B corresponds to the length of the shortest line segment among many line segments each connecting any given point within A to any given point within B.

The term "circuit component" refers to a component that includes an active element and/or a passive element. This means that circuit components encompass active components such as transistors and diodes, and passive components such as inductors, transformers, capacitors, and resistors. However, circuit components do not encompass electromechanical components such as terminals, connectors, and wires.

As used in the present disclosure, the term "terminal" refers to a point at which a conductor within an element terminates. When the impedance of a conductor between elements is sufficiently low, the "terminal" is interpreted not only as a single point but also as any point in the conductor between the elements, or as the entire conductor.

Terms describing relationships between elements, such as "parallel" and "vertical", terms indicating an element's shape, such as "rectangular", and numerical ranges are not meant to convey only precise meanings. These terms and numerical ranges denote meanings that are substantially the same, involving, for example, about several percent differences.

The expression "A and B are stacked together" refers to a situation in which A and B overlap in plan view. A and B may be in contact with each other, or another member may be interposed between A and B.

As used in this specification, unless otherwise noted, ordinal numerals such as "first" and "second" do not indicate the number or order of constituent elements; the ordinal numerals are used for the purpose of avoiding confusion of constituent elements of the same type and distinguishing between the constituent elements.

EMBODIMENT

1 Circuit Configuration of Radio-Frequency Module 1 and Communication Device 4

A circuit configuration of a radio-frequency module 1 and a communication device 4 according to the present exemplary embodiment will be described with reference to FIG. 1. FIG. 1 is a circuit configuration diagram of the radio-frequency module 1 and the communication device 4 according to the present exemplary embodiment.

FIG. 1 illustrates an exemplary circuit configuration. The communication device 4 may be implemented using any of various circuit implementations and circuit techniques. Hence, the description of the communication device 4 provided below is not limiting.

1.1 Circuit Configuration of Communication Device 4

First, a circuit configuration of the communication device 4 will be described.

The communication device 4 according to the present exemplary embodiment corresponds to a user equipment (UE) for cellular networks (also referred to as mobile networks), and is typically, for example, a mobile phone, smartphone, tablet computer, or wearable device. The communication device 4 may be an Internet of Things (IoT) sensor device, medical/health care device, automobile, unmanned aerial vehicle (UAV) (drone), or automated guided vehicle (AGV). The communication device 4 may operate as a base station (BS) in cellular networks.

As illustrated in FIG. 1, the communication device 4 includes the radio-frequency module 1, an antenna 2, and a radio-frequency (RF) signal processing circuit (RFIC) 3.

The radio-frequency module 1 is operable to transfer radio-frequency signals between the antenna 2 and the RFIC 3. A specific circuit configuration of the radio-frequency module 1 will be described later.

The antenna 2 is coupled to an antenna connection terminal 100 of the radio-frequency module 1. The antenna 2 is operable to transmit radio-frequency signals (transmit signals) outputted from the radio-frequency module 1. The antenna 2 is also operable to receive radio-frequency signals (receive signals) from outside and output the radio-frequency signals to the radio-frequency module 1.

The RFIC 3 is an example of a signal processing circuit configured to process a radio-frequency signal. Specifically, the RFIC 3 is operable to process, for example by down-conversion, radio-frequency receive signals inputted through receive paths of the radio-frequency module 1 and output the receive signals generated through the signal processing to a baseband signal processing circuit (BBIC, not illustrated in the drawing). The RFIC 3 is also operable to process, for example by up-conversion, transmit signals inputted from the BBIC and output the radio-frequency transmit signals generated through the signal processing to transmit paths of the radio-frequency module 1. The RFIC 3 includes a control unit, which is a circuit for controlling elements included in the radio-frequency module 1, such as switches and amplifiers. The function of the control unit of the RFIC 3 may be partially or entirely implemented outside the RFIC 3; for example, the function of the control unit of the RFIC 3 may be implemented in the radio-frequency module 1 or the BBIC.

The configuration of the communication device 4 is not limited to the example illustrated in FIG. 1. For example, the communication device 4 may include the BBIC. The communication device 4 may include multiple antennas 2. Alternatively, it may be possible that the communication device 4 does not include any antenna 2.

1.2 Circuit Configuration of Radio-Frequency Module 1

Next, a circuit configuration of the radio-frequency module 1 will be described.

As illustrated in FIG. 1, the radio-frequency module 1 includes a power amplifier 10, a power amplifier (PA)

control circuit 12, a low-noise amplifier 20, a switch 30, transmit filters 41, 42, 43a, and 44a, receive filters 43b, 44b, and 45, an antenna switch 50, a matching circuit 60, the antenna connection terminal 100, a radio-frequency input terminal 110, a radio-frequency output terminal 120, and a control terminal 130.

The antenna connection terminal 100, the radio-frequency input terminal 110, the radio-frequency output terminal 120, and the control terminal 130 are external connection terminals included in the radio-frequency module 1. The antenna connection terminal 100 is coupled to the antenna 2 outside the radio-frequency module 1 and to a common terminal 50a of the antenna switch 50 inside the radio-frequency module 1. The radio-frequency input terminal 110 is coupled to the RFIC 3 outside the radio-frequency module 1 and to the input end of the power amplifier 10 inside the radio-frequency module 1. The radio-frequency output terminal 120 is coupled to the RFIC 3 outside the radio-frequency module 1 and to the output end of the low-noise amplifier 20 inside the radio-frequency module 1. The control terminal 130 is coupled to the RFIC 3 outside the radio-frequency module 1 and to the PA control circuit 12 inside the radio-frequency module 1.

The power amplifier 10 is configured to amplify transmit signals outputted from the RFIC 3. The power amplifier 10 is coupled to the transmit filters 41, 42, 43a, and 44a via the switch 30. Specifically, the input end of the power amplifier 10 is coupled to the radio-frequency input terminal 110. The output end of the power amplifier 10 is coupled to the transmit filters 41, 42, 43a, and 44a via the matching circuit 60 and the switch 30.

In the present exemplary embodiment, the power amplifier 10 is able to amplify transmit signals in multiple bands. The bands refer to frequency bands for communication systems that are built using radio access technologies (RAT), determined by, for example, standards organizations such as the 3rd Generation Partnership Project (3GPP, registered trademark) and the Institute of Electrical and Electronics Engineers (IEEE)). As the communication systems in the exemplary embodiment and practical examples, for example, a Long-Term Evolution (LTE) system, a 5th Generation New Radio (5G NR) system, and a Wireless Local Area Network (WLAN) system may be used, but these are not to be interpreted as limiting.

An uplink operating band refers to a frequency range designated for uplink within the bands. A downlink operating band refers to a frequency range designated for downlink within the bands.

The power amplifier 10 is able to amplify transmit signals in accordance with multiple power classes. Power classes are classification divisions of output power for terminals, defined by maximum output power. The smaller the power class number, the greater the allowable maximum output power. For example, according to 3GPP (registered trademark), the maximum output power for Power Class 1 (PC1) is 31 dBm, the maximum output power for Power Class 1.5 (PC1.5) is 29 dBm, the maximum output power for Power Class 2 (PC2) is 26 dBm, and the maximum output power for Power Class 3 (PC3) is 23 dBm. The power amplifier 10 is capable of amplifications that correspond to at least PC2 and PC3.

The maximum output power is defined based on the maximum output power at the antenna end. The maximum output power of a UE can be measured using a method defined by 3GPP (registered trademark) or other standardization organizations. For example, in FIG. 1, the maximum output power can be measured by measuring the electric power emitted from the antenna 2. In place of measuring emitted electric power, the maximum output power of the antenna 2 can be measured using a measuring device (for example, a spectrum analyzer) that is coupled to a terminal provided near the antenna 2.

The PA control circuit 12 is an example of a control circuit for controlling the power amplifier 10. Specifically, the PA control circuit 12 is operable to perform switching of operating modes (power classes) of the power amplifier 10. For example, the PA control circuit 12 is operable to control a bias supplied to the power amplifier 10 to amplify transmit signals such that the transmit signals can be transmitted at a desired power level from the antenna 2.

The PA control circuit 12 may also be operable to control the switch 30 and the antenna switch 50. For example, the PA control circuit 12 may control switching of the connection in the switch 30 and the connection in the antenna switch 50 to suit the individual operating modes of the power amplifier 10.

The low-noise amplifier 20 is configured to amplify receive signals received by the antenna 2. The low-noise amplifier 20 is coupled to the receive filters 43b, 44b, and 45. Specifically, the input end of the low-noise amplifier 20 is coupled to the output ends of the receive filters 43b, 44b, and 45. The output end of the low-noise amplifier 20 is coupled to the radio-frequency output terminal 120.

The switch 30 is an example of a transmit switch. The switch 30 is operable to provide switching to change the transfer destination of transmit signals outputted by the power amplifier 10. The switch 30 has a common terminal 30a and selection terminals 30b, 30c, 30d, and 30e.

The common terminal 30a is an example of a first common terminal. The common terminal 30a is coupled to the output end of the power amplifier 10. In the present exemplary embodiment, the common terminal 30a is coupled to the output end of the power amplifier 10 via the matching circuit 60. The selection terminal 30b is an example of a first selection terminal. The selection terminal 30b is coupled to the input end of the transmit filter 41. The selection terminal 30c is an example of a first selection terminal. The selection terminal 30c is coupled to the input end of the transmit filter 42. The selection terminal 30d is an example of a second selection terminal. The selection terminal 30d is coupled to the input end of the transmit filter 43a. The selection terminal 30e is an example of a second selection terminal. The selection terminal 30e is coupled to the input end of the transmit filter 44a.

The switch 30 is a single-pole four-throw (SP4T) switch. The common terminal 30a is configured to be connected to the selection terminals 30b, 30c, 30d, and 30e. When the common terminal 30a is connected to one of the selection terminals 30b, 30c, 30d, and 30e, the common terminal 30a is not connected to the other three selection terminals. The connection between the common terminal 30a and the selection terminals 30b, 30c, 30d, and 30e can be changed to suit the individual operating modes (power classes) of the power amplifier 10 and the individual transmit signal bands. Switching the connection can be performed by, for example, the PA control circuit 12, the RFIC 3, or a control unit that is not illustrated in the drawing. The configuration of the switch 30 is not limited to the example illustrated in FIG. 1. For example, the switch 30 may include multiple common terminals (for example, common terminals coupled to multiple power amplifiers); the number of selection terminals is not limited to a specific number.

The antenna switch 50 is operable to provide switching of transfer paths coupled to the antenna 2. The antenna switch 50 has a common terminal 50*a* and selection terminals 50*b*, 50*c*, 50*d*, and 50*e*.

The common terminal 50*a* is an example of a second common terminal. The common terminal 50*a* is coupled to the antenna 2 via the antenna connection terminal 100. The selection terminal 50*b* is an example of a third selection terminal. The selection terminal 50*b* is coupled to the output end of the transmit filter 41. The selection terminal 50*c* is an example of a third selection terminal. The selection terminal 50*c* is coupled to the output end of the transmit filter 42. The selection terminal 50*d* is an example of a fourth selection terminal. The selection terminal 50*d* is coupled to the output ends of the transmit filters 43*a* and 44*a* and to the input ends of the receive filters 43*b*, 44*b*, and 45. The selection terminal 50*e* is an example of a fourth selection terminal. The selection terminal 50*e* can be coupled to, for example, other filters that are not illustrated in the drawing. However, this is not to be interpreted as limiting. For example, the selection terminal 50*e* may be coupled to the output end of the transmit filter 44*a* and the input end of the receive filter 44*b* and/or to the input end of the receive filter 45. It should be noted that the selection terminal 50*e* is not necessarily provided.

The antenna switch 50 is an SP4T switch. The common terminal 50*a* is configured to be connected to the selection terminals 50*b*, 50*c*, 50*d*, and 50*e*. When the common terminal 50*a* is connected to one of the selection terminals 50*b*, 50*c*, 50*d*, and 50*e*, the common terminal 50*a* is not connected to the other three selection terminals. The connection between the common terminal 50*a* and the selection terminals 50*b*, 50*c*, 50*d*, and 50*e* can be changed to suit the individual operating modes (power classes) of the power amplifier 10 and the individual transmit signal bands. Switching the connection can be performed by, for example, the PA control circuit 12, the RFIC 3, or a control unit that is not illustrated in the drawing. The configuration of the antenna switch 50 is not limited to the example illustrated in FIG. 1. For example, the antenna switch 50 may include multiple common terminals (for example, common terminals coupled to multiple antennas); the number of selection terminals is not limited to a specific number.

The transmit filter 41 is an example of a first acoustic wave filter. The transmit filter 41 has a pass band that includes an uplink operating band of a first band for frequency division duplex (FDD). The first band represents, for example, 4G-LTE Band B1 or 5G-NR Band n1. However, this is not to be interpreted as limiting. The input end of the transmit filter 41 is coupled to the selection terminal 30*b* of the switch 30. The output end of the transmit filter 41 is coupled to the selection terminal 50*b* of the antenna switch 50.

An acoustic wave filter is a surface acoustic wave (SAW) filter. An acoustic wave filter includes multiple resonators and achieves a desired pass band with a particular combination of the resonators. Alternatively, an acoustic wave filter may be a bulk acoustic wave (BAW) filter. For example, a film bulk acoustic resonator (FBAR) or solidly mounted resonator (SMR) can be used to construct a resonator of the BAW filter.

The transmit filter 42 is an example of an acoustic wave filter. The transmit filter 42 has a pass band that includes an uplink operating band of a second band for FDD. The second band represents, for example, 4G-LTE Band B3 or 5G-NR Band n3. However, this is not to be interpreted as limiting. The input end of the transmit filter 42 is coupled to the selection terminal 30*c* of the switch 30. The output end of the transmit filter 42 is coupled to the selection terminal 50*c* of the antenna switch 50.

The transmit filter 43*a* is an example of a second acoustic wave filter. The transmit filter 43*a* has a pass band that includes the uplink operating band of the first band for FDD. For example, the pass band of the transmit filter 43*a* is identical to the pass band of the transmit filter 41, or at least a portion of the pass band of the transmit filter 43*a* coincides with at least a portion of the pass band of the transmit filter 41. The input end of the transmit filter 43*a* is coupled to the selection terminal 30*d* of the switch 30. The output end of the transmit filter 43*a* is coupled to the selection terminal 50*d* of the antenna switch 50. The transmit filter 43*a* and the receive filter 43*b* constitute a duplexer 43 (see, for example, FIG. 3A).

The transmit filter 44*a* is an example of an acoustic wave filter. The transmit filter 44*a* has a pass band that includes the uplink operating band of the second band for FDD. For example, the pass band of the transmit filter 44*a* is identical to the pass band of the transmit filter 42, or at least a portion of the pass band of the transmit filter 44*a* coincides with at least a portion of the pass band of the transmit filter 42. The input end of the transmit filter 44*a* is coupled to the selection terminal 30*e* of the switch 30. The output end of the transmit filter 44*a* is coupled to the selection terminal 50*d* of the antenna switch 50. The output end of the transmit filter 44*a* may be coupled to the selection terminal 50*e* of the antenna switch 50. The transmit filter 44*a* and the receive filter 44*b* constitute a duplexer 44 (see, for example, FIG. 3A).

The transmit filters 41 and 42 correspond to PC2. The transmit filters 43*a* and 44*a* correspond to PC3. This means that the transmit filters 41 and 43*a* have pass bands that correspond to an identical uplink operating band, but the maximum output power (power class) of signals that can be passed differs between the transmit filters 41 and 43*a*. Specifically, the maximum output power of signals that the transmit filter 41 passes is greater than the maximum output power of signals that the transmit filter 43*a* passes. To pass signals with higher maximum output power, the transmit filter 41 has an electric power handling capability that is higher than the electric power handling capability of the transmit filter 43*a*.

For example, the size of the transmit filter 41 is larger than the size of the transmit filter 43*a*. By increasing the size, the electric power handling capability can be increased. The size of a filter may refer to, for example, the footprint of the filter in plan view of a major surface 90*a* of a module substrate 90 when the filter is mounted on the module substrate 90 (see, for example, FIGS. 3A and 3B). Alternatively, the size of a filter may refer to the volume of the filter.

The number of resonators of the transmit filter 41 may be greater than the number of resonators of the transmit filter 43*a*. By increasing the number of resonators, the electric power handling capability can be increased. Alternatively, because the electric power handling capability of a BAW filter is typically higher than the electric power handling capability of a SAW filter, the transmit filter 41 may be a BAW filter, and the transmit filter 43*a* may be a SAW filter. Alternatively, the transmit filters 41 and 43*a* may be configured to have different electric power handling capabilities by changing, for example, materials or electrode shapes.

The same holds for the transmit filters 42 and 44*a*. Specifically, the electric power handling capability of the transmit filter 42 is higher than the electric power handling capability of the transmit filter 44*a*. For example, the size of the transmit filter 42 is larger than the size of the transmit filter 44*a*. The number of resonators of the transmit filter 42 may be greater than the number of resonators of the transmit filter 44*a*. The transmit filter 42 may be a BAW filter, and the transmit filter 44*a* may be a SAW filter.

The receive filter 43*b* is an example of a third acoustic wave filter. The receive filter 43*b* has a pass band that includes a downlink operating band of the first band for FDD. The input end of the receive filter 43*b* is coupled to the selection terminal 50*d* of the antenna switch 50. The output end of the receive filter 43*b* is coupled to the input end of the low-noise amplifier 20.

The receive filter 44*b* is an example of an acoustic wave filter. The receive filter 44*b* has a pass band that includes a downlink operating band of the second band for FDD. The input end of the receive filter 44*b* is coupled to the selection terminal 50*d* of the antenna switch 50. The output end of the receive filter 44*b* is coupled to the input end of the low-noise amplifier 20. The input end of the receive filter 44*b* may be coupled to the selection terminal 50*e* of the antenna switch 50.

The receive filter 45 is an example of an acoustic wave filter. The receive filter 45 has a pass band that includes at least a portion of a third band. In the present exemplary embodiment, the third band is a band for time division duplex (TDD), and the third band represents, for example, 4G-LTE Band B40 or 5G-NR Band n40. The third band may be a band for FDD. The receive filter 45 may have a pass band that includes a downlink operating band of a band for FDD. The input end of the receive filter 45 is coupled to the selection terminal 50*d* of the antenna switch 50. The output end of the receive filter 45 is coupled to the input end of the low-noise amplifier 20. The input end of the receive filter 45 may be coupled to the selection terminal 50*e* of the antenna switch 50.

The matching circuit 60 is operable to provide output impedance matching for the power amplifier 10. The matching circuit 60 includes, for example, at least one of an inductor, a capacitor, and a resistor. Matching circuits for impedance matching other than the matching circuit 60 may be provided. For example, matching circuits may be provided between the radio-frequency input terminal 110 and the input end of the power amplifier 10, between the output end of the low-noise amplifier 20 and the radio-frequency output terminal 120, and between the input end of the low-noise amplifier 20 and the receive filters 43*b*, 44*b*, and 45.

The configuration of the radio-frequency module 1 is not limited to the example illustrated in FIG. 1. For example, it may be possible that the radio-frequency module 1 does not include the transmit filters 42 and 44*a* and the receive filters 44*b* and 45. In this case, the switch 30 does not necessarily have the selection terminals 30*c* and 30*e*, and the antenna switch 50 does not necessarily have the selection terminal 50*c*. It may be possible that the radio-frequency module 1 does not include the matching circuit 60. In this case, the output end of the power amplifier 10 is directly coupled to the common terminal 30*a* of the switch 30.

It may be possible that the radio-frequency module 1 includes multiple power amplifiers 10 and multiple low-noise amplifiers 20. For example, the multiple power amplifiers 10 may be configured to amplify transmit signals in different bands. The multiple low-noise amplifiers 20 may be configured to amplify receive signals in different bands.

It may be possible that the radio-frequency module 1 includes no power amplifier 10 and no low-noise amplifier 20. In this case, the common terminal 30*a* of the switch 30 may be coupled to, among multiple external connection terminals included in the radio-frequency module 1, an external connection terminal that can be coupled to the output end of a power amplifier provided outside the radio-frequency module 1. The output ends of the receive filters 43*b*, 44*b*, and 45 may be coupled to, among multiple external connection terminals included in the radio-frequency module 1, an external connection terminal that can be coupled to the input end of a low-noise amplifier provided outside the radio-frequency module 1.

It may be possible that the transmit filters 42 and 44*a* and the receive filters 44*b* and 45 are not acoustic wave filters. For example, the transmit filters 42 and 44*a* and the receive filters 44*b* and 45 may be LC filters composed of, for example, inductors and capacitors.

2 Operation

Next, operations of the radio-frequency module 1 according to the present exemplary embodiment will be described. The following primarily describes operations for transmitting and receiving signals in the first band (Band B1). To transmit and receive signals in the second band (Band B3), the radio-frequency module 1 performs the same operations as the operations for the first band.

To transfer transmit signals in the first band, the radio-frequency module 1 can operate in either a PC2 mode or a PC3 mode. This means that the radio-frequency module 1 is able to cause the antenna 2 to transmit transmit signals with higher maximum output power (PC2 mode) when necessary under certain conditions.

When the maximum output power of transmit signals is relatively high, specifically when the radio-frequency module 1 operates in the PC2 mode, concern arises regarding the quality degradation of transmit signals due to the increase in the amount of heat generation, and the electric power handling capabilities of circuit components such as filters. For this reason, the radio-frequency module 1 according to the present exemplary embodiment is provided with the transmit filter 41 with a relatively high electric power handling capability to operate in the PC2 mode.

The radio-frequency module 1 is configured to transfer transmit signals using the half duplex frequency division duplex (HD-FDD) method. Specifically, in the PC2 mode, the radio-frequency module 1 transmits transmit signals in the first band using the TDD method; in the PC3 mode, the radio-frequency module 1 transmits transmit signals in the first band using the FDD method. This means that the radio-frequency module 1 is able to receive receive signals of the first band in the PC3 mode, whereas the radio-frequency module 1 is unable to receive receive signal of the first band in the PC2 mode.

Figure 2A:
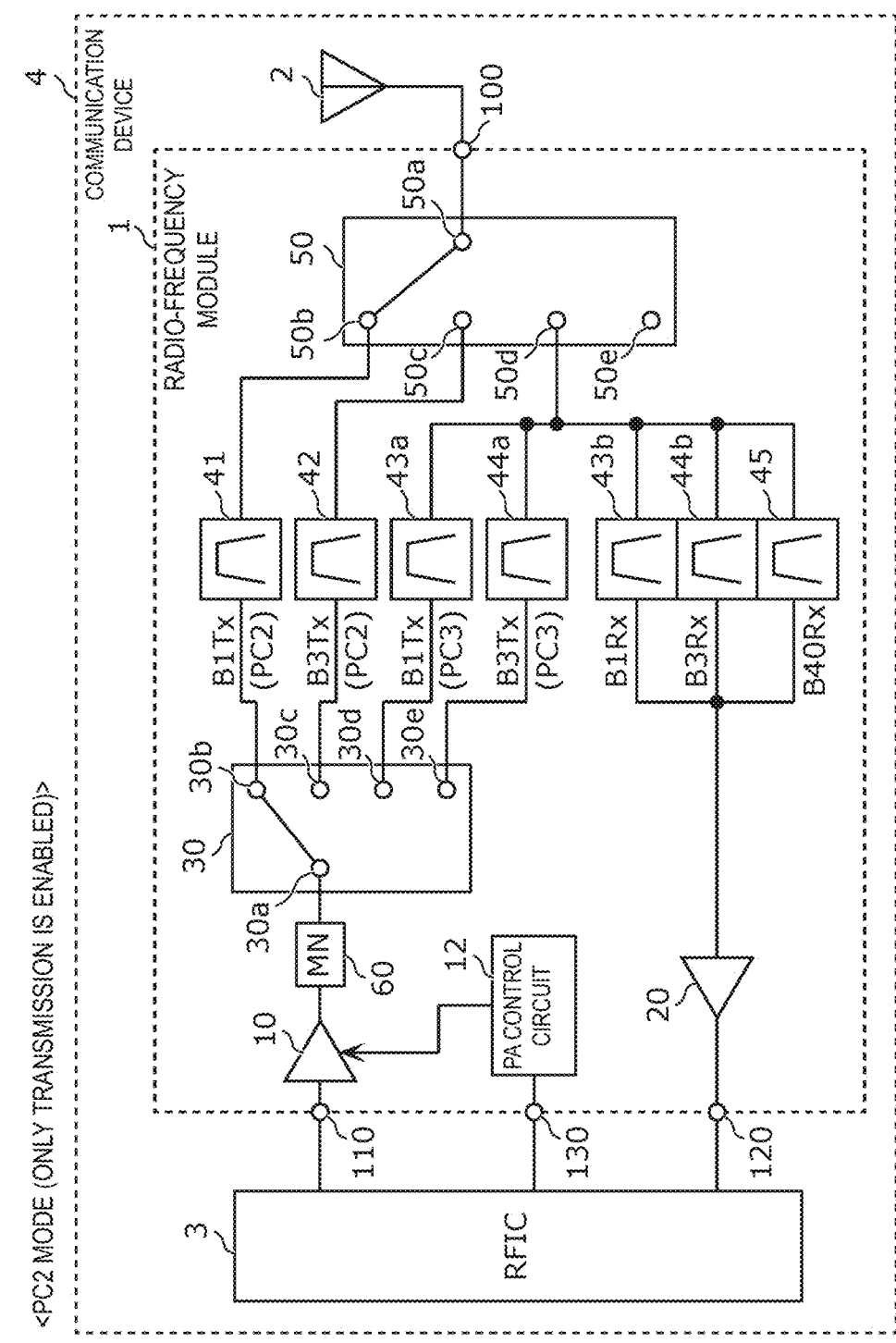
FIG. 2A is a circuit configuration diagram illustrating connections in switches of the radio-frequency module according to the exemplary embodiment when the radio-frequency module operates in a Power Class 2 (PC2) mode.

FIG. 2A is a circuit configuration diagram illustrating connections in the switches of the radio-frequency module 1 according to the present exemplary embodiment when the radio-frequency module 1 operates in the PC2 mode. As illustrated in FIG. 2A, when the radio-frequency module 1 operates in the PC2 mode, the common terminal 30*a* is connected to the selection terminal 30*b* in the switch 30, and the common terminal 50*a* is connected to the selection terminal 50*b* in the antenna switch 50. As a result, the transmit signals of the first band amplified by the power amplifier 10 in the PC2 mode can be passed through the transmit filter 41, which has a relatively high electric power handling capability, and transmitted from the antenna 2.

Because the common terminal 50*a* is not connected to the selection terminal 50*d* in the antenna switch 50, the low-noise amplifier 20 and the receive filters 43*b*, 44*b*, and 45 are disconnected from the antenna 2. As a result, neither the low-noise amplifier 20 nor the receive filters 43*b*, 44*b*, and 45 operate, and thus, heat generation by these circuit components can be reduced.

As described above, in the PC2 mode, the power amplifier 10 and the transmit filter 41 serve as main heat generating sources, and heat generation by the other components is reduced. Reducing heat generation consequently minimizes the quality degradation of transmit signals. Additionally, the deterioration of the electric power handling capability that can be caused by the influence of heat is suppressed. Because reception of receive signals is not performed in the PC2 mode, the quality degradation of receive signals that can be caused by the influence of heat generated in the circuit components in the transmit paths is minimized.

Figure 2B:
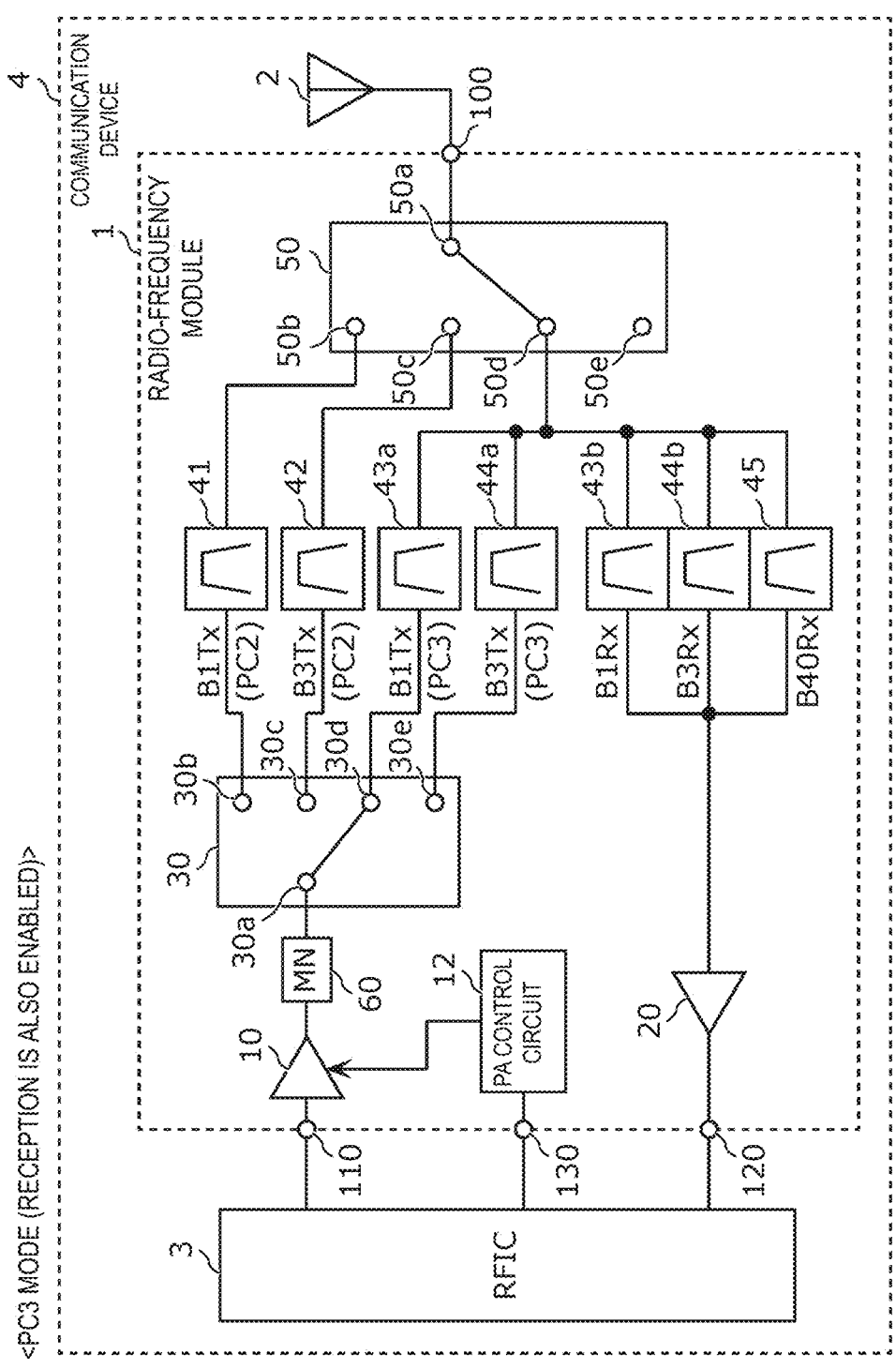
FIG. 2B is a circuit configuration diagram illustrating connections in the switches of the radio-frequency module according to the exemplary embodiment when the radio-frequency module operates in a Power Class 3 (PC3) mode.

FIG. 2B is a circuit configuration diagram illustrating connections in the switches of the radio-frequency module 1 according to the present exemplary embodiment when the radio-frequency module 1 operates in the PC3 mode. As illustrated in FIG. 2B, when the radio-frequency module 1 operates in the PC3 mode, the common terminal 30*a* is connected to the selection terminal 30*d* in the switch 30, and the common terminal 50*a* is connected to the selection terminal 50*d* in the antenna switch 50. As a result, the transmit signals of the first band amplified by the power amplifier 10 in the PC3 mode can be passed through the transmit filter 43*a* and transmitted from the antenna 2. Additionally, the receive signals of the first band received by the antenna 2 can be passed through the receive filter 43*b*, amplified by the low-noise amplifier 20, and output to the RFIC 3.

In the present exemplary embodiment, the input ends of the receive filters 43*b*, 44*b*, and 45 are coupled to the selection terminal 50*d*. As a result, as well as the receive signals of the first band, the receive signals of the second band (Band B3) and the receive signals of the third band (band B40) can be simultaneously received in the PC3 mode.

The amount of heat generated in the power amplifier 10 and the transmit filter 41 in the PC3 mode is less than in the PC2 mode. Thus, when heat is generated in the low-noise amplifier 20 and the receive filters 43*b*, 44*b*, and 45, the heat can be adequately dissipated. The amount of heat generated in the low-noise amplifier 20 and the receive filters 43*b*, 44*b*, and 45 is usually less than the amount of heat generated by the power amplifier 10 and the other components. Overall, in the PC3 mode, while the degradation of signal quality is minimized, simultaneous transmission and reception are enabled.

3 Practical Examples

Next, specific practical examples of the radio-frequency module 1 having the circuit configuration described above will be described.

3.1 First Practical Example

First, a radio-frequency module 1A according to a first practical example will be described with reference to FIGS. 3A and 3B.

Figure 3A:
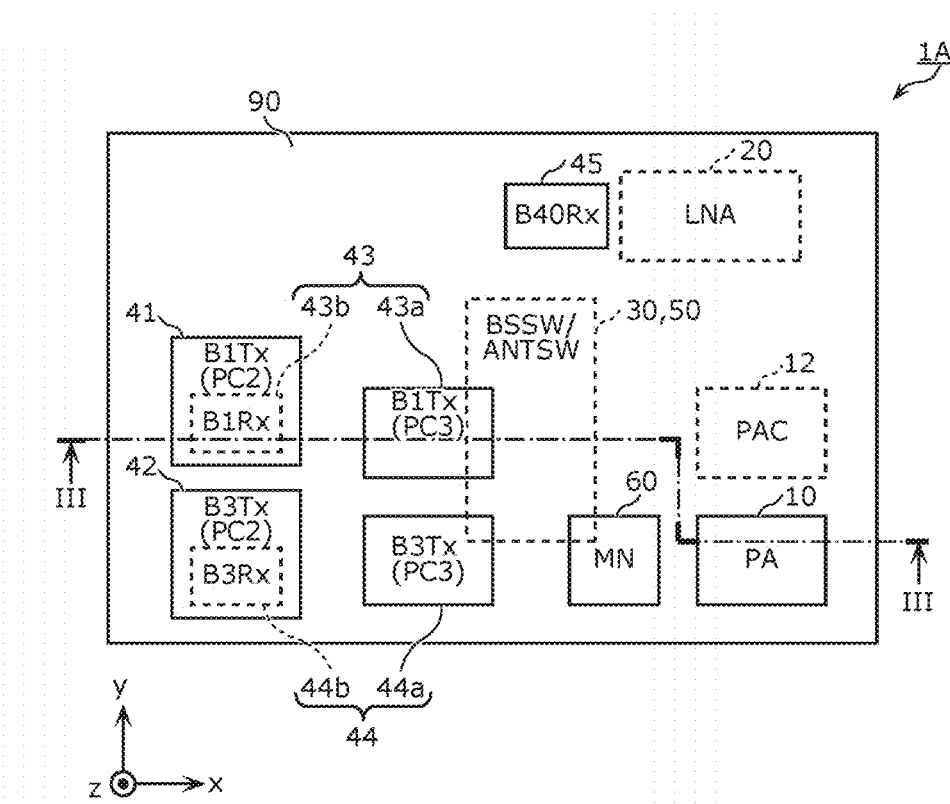
FIG. 3A is a plan view of a radio-frequency module according to a first practical example.
Figure 3B:
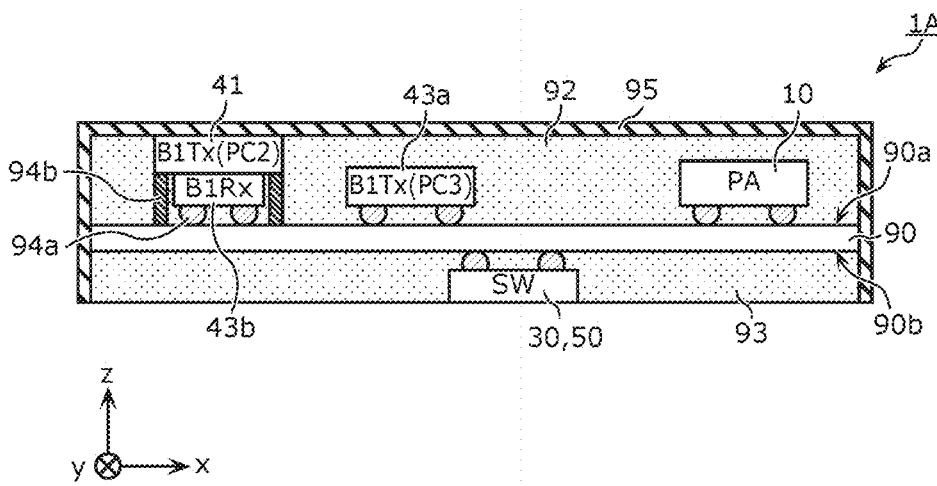
FIG. 3B is a sectional view of the radio-frequency module according to the first practical example.

FIG. 3A is a plan view of the radio-frequency module 1A according to the first practical example, and FIG. 3B is a sectional view of the radio-frequency module 1A according to the first practical example. FIG. 3A illustrates the radio-frequency module 1A when the major surface 90*a* of the module substrate 90 is viewed from the positive side of the z-axis. In FIG. 3A, resin members 92 and 93, a shielding film 95, and electrodes, and other elements are not illustrated. The circuit components disposed at a major surface 90*b* of the module substrate 90 and the circuit components disposed between other circuit components and the major surface 90*a* of the module substrate 90 are illustrated by dashed lines. FIG. 3B illustrates a section (an xz section) that corresponds to segments parallel to the x-axis of line III-III in FIG. 3A. In FIGS. 3A and 3B, for ease of understanding, each circuit component is labeled with letters such as "PA". However, these letters are not necessarily marked on the actual circuit components. The same illustration method is applied to FIGS. 4A to 5B, which will be described later.

The circuit configuration of the radio-frequency module 1A illustrated in FIGS. 3A and 3B is identical to the circuit configuration of the radio-frequency module 1 illustrated in FIG. 1. The radio-frequency module 1A includes the module substrate 90, the resin members 92 and 93, and the shielding film 95.

The module substrate 90 is a substrate on which the circuit components constituting the radio-frequency module 1A are mounted. As the module substrate 90, for example, a low temperature co-fired ceramic (LTCC) substrate that has a layered structure composed of multiple dielectric layers, a high temperature co-fired ceramic (HTCC) substrate, a component-embedded substrate, a substrate including a redistribution layer (RDL) (for example, an LTCC substrate including an RDL), or a printed-circuit board can be used. However, these are not to be interpreted as limiting.

The module substrate 90 has the major surface 90*a*, and the major surface 90*b* that is opposite to the major surface 90*a*. For example, ground electrode layers and wires are formed inside the module substrate 90 or at the major surface 90*a* or 90*b*. The ground electrode layers and wires are formed using conductive materials such as metal. As illustrated in FIG. 3A, the module substrate 90 is rectangular in plan view. However, this is not to be interpreted as limiting.

The major surface 90*a* is an example of a first major surface. The major surface 90*a* is sometimes referred to as the upper surface or the top surface. The major surface 90*b* is an example of a second major surface. The major surface 90*b* is sometimes referred to as the lower surface or the bottom surface. In the present practical example, one or more circuit components are disposed at each of the major surfaces 90*a* and 90*b*. This means that the module substrate 90 is a double-sided mounting board with the major surfaces 90*a* and 90*b* used as the mounting surfaces for circuit components.

The one or more circuit components are surface mount devices (SMDs). Specifically, the circuit components may be integrated circuits (ICs), integrated passive devices (IPDs), or discrete passive components such as chip inductors or chip capacitors. The integrated circuits may be constructed using, for example, complementary metal oxide semiconductor (CMOS) using Si substrates. Specifically, the integrated circuits may be constructed through a silicon on insulator (SOI) process. The integrated circuits may be made of at least one of GaAs, SiGe, and GaN.

In the present practical example, the power amplifier 10, the transmit filters 41, 42, 43*a*, and 44*a*, the receive filters 43*b*, 44*b*, and 45, and the matching circuit 60 are disposed at the major surface 90*a*. The PA control circuit 12, the low-noise amplifier 20, the switch 30, and the antenna switch 50 are disposed at the major surface 90*b*.

The power amplifier 10, the PA control circuit 12, and the low-noise amplifier 20 are formed by integrated circuits. The switch 30 and the antenna switch 50 are formed together by one integrated circuit. However, the switch 30 and the antenna switch 50 may be individually formed by discrete integrated circuits. The matching circuit 60 is, for example, a chip inductor or chip capacitor, or an IPD. However, this is not to be interpreted as limiting. At least a portion of the matching circuit 60 may be formed by a wire provided at the module substrate 90.

As illustrated in FIG. 3B, the transmit filter 41 and the receive filter 43b are stacked together and positioned beside the major surface 90a. In the present practical example, the receive filter 43b is positioned between the module substrate 90 and the transmit filter 41. Specifically, the receive filter 43b is electrically coupled to a wire provided at the major surface 90a of the module substrate 90 by bump electrodes 94a. The electrical connection between the receive filter 43b and the wire at the module substrate 90 is not necessarily provided by the bump electrodes 94a; the electrical connection between the receive filter 43b and the wire at the module substrate 90 may be provided by, for example, planar electrodes, post electrode, or bonding wires.

The transmit filter 41 covers the receive filter 43b. For example, the transmit filter 41 is positioned in contact with the upper surface (the surface on the positive side of the z-axis, opposite to the surface facing the module substrate 90) of the receive filter 43b.

In the present practical example, the receive filter 43b is smaller than the transmit filter 41 in plan view of the major surface 90a. As a result, when the transmit filter 41 is disposed on the receive filter 43b, a portion of the transmit filter 41 protrudes beyond the top surface of the receive filter 43b. The protruding portion of the transmit filter 41 is used to provide the electrical connection between the transmit filter 41 and the wire provided at the major surface 90a of the module substrate 90. For example, the transmit filter 41 is electrically coupled to the wire of the module substrate 90 by the post electrodes 94b. The electrical connection between the transmit filter 41 and the wire at the module substrate 90 is not necessarily provided by the post electrodes 94b; the electrical connection between the transmit filter 41 and the wire at the module substrate 90 may be provided by, for example, bonding wires, or wires or through electrodes provided in the receive filter 43b.

The transmit filter 41 is in contact with the shielding film 95. The shielding film 95 is made using a material having a relatively high thermal conductivity such as metal, and thus, heat generated in the transmit filter 41 can be dissipated through the shielding film 95. In the present practical example, as illustrated in FIG. 3B, the upper surface (the surface on the positive side of the z-axis, opposite to the surface facing the receive filter 43b) of the transmit filter 41 is in contact with the shielding film 95. Because this configuration increases the contact area with the shielding film 95, thermal conduction can be carried out more rapidly. This configuration thus increases the efficiency of heat dissipation.

As described above, by disposing the transmit filter 41 and the receive filter 43b at the major surface 90a in a stacked arrangement, the plane footprint of the transmit filter 41 and the receive filter 43b is reduced as compared to when the transmit filter 41 and the receive filter 43b are disposed at the major surface 90a without being stacked together. This configuration reduces the area of the module substrate 90, thereby reducing the dimensions of the radio-frequency module 1A.

When the transmit filter 41 and the receive filter 43b are stacked together, signal quality may degrade if isolation between transmit signals and receive signals cannot be ensured. In the present practical example, because the transmit filter 41 corresponds to PC2, transmit signals can be passed through the transmit filter 41 in the PC2 mode. By contrast, the receive filter 43b does not pass receive signals in the PC2 mode. The receive filter 43b passes receive signals in the PC3 mode. In this mode, the transmit filter 41 does not pass transmit signals (the transmit filter 43a passes transmit signals). This means that the transmit filter 41 and the receive filter 43b do not simultaneously pass transmit signals or receive signals. For this reason, although the transmit filter 41 and the receive filter 43b are stacked together, there is no concern regarding the isolation between transmit signals and receive signals. This configuration thus minimizes degradation of signal quality.

The transmit filter 43a is disposed at the major surface 90a of the module substrate 90. As illustrated in FIG. 3A, in plan view of the major surface 90a, the distance between the power amplifier 10 and the transmit filter 41 is longer than the distance between the power amplifier 10 and the transmit filter 43a. In simpler terms, the transmit filter 41 is disposed farther from the power amplifier 10 than the transmit filter 43a.

As described above, the transmit filter 43a corresponds to PC3, and the transmit filter 41 corresponds to PC2. Thus, the amount of heat generated in the transmit filter 41 is greater than the amount of heat generated in the transmit filter 43a. Further, the amount of heat generated in the power amplifier 10 is greater when operating in the PC2 mode than when operating in the PC3 mode.

By increasing the distance between the transmit filter 41 and the power amplifier 10, both of which generate more heat in the PC2 mode, as compared to the distance between the transmit filter 43a and the power amplifier 10, the heat sources can be positioned in a dispersed manner at the module substrate 90. As such, the mutual thermal interference between the power amplifier 10 and the transmit filter 41 can be mitigated when operating in the PC2 mode. This configuration thus minimizes degradation of signal quality and deterioration of the electric power handling capability.

In the present practical example, the transmit filter 43a is disposed between the power amplifier 10 and the transmit filter 41. However, this is not to be interpreted as limiting. For example, the power amplifier 10 may be disposed between the transmit filters 41 and 43a.

The same applies to the positional relationship between the transmit filters 42 and 44a and the receive filter 44b. Specifically, the transmit filter 42 and the receive filter 44b are stacked together and positioned beside the major surface 90a. More specifically, the receive filter 44b is positioned between the transmit filter 42 and the module substrate 90. In plan view of the major surface 90a, the distance between the power amplifier 10 and the transmit filter 42 is longer than the distance between the power amplifier 10 and the transmit filter 44a. This configuration reduces the dimensions and minimizes degradation of signal quality and deterioration of the electric power handling capability.

In the present practical example, to enhance the isolation between transmission and reception, the low-noise amplifier 20 and the receive filter 45 are disposed distant from the power amplifier 10 in plan view of the major surface 90a. For example, when the major surface 90a is divided into two equal regions by a line parallel to the x-axis, the region including the power amplifier 10 (the region on the negative side of the y-axis) and the region including the low-noise amplifier 20 and the receive filter 45 (the region on the positive side of the y-axis) are different. This configuration enhances the isolation between transmission and reception, thereby minimizing degradation of signal quality. Additionally, because the heat generating sources are positioned in a dispersed manner, this configuration further minimizes degradation of signal quality and also reduces deterioration of the electric power handling capability.

The resin member 92 covers the major surface 90a and at least one of the circuit components disposed at the major surface 90a. Specifically, the resin member 92 covers the power amplifier 10, the transmit filters 41, 42, 43a, and 44a, the receive filters 43b, 44b, and 45, and the matching circuit 60. As used herein, the expression "A covers B" refers to a situation in which it is sufficient for A to cover a portion of a surface of B. For example, the resin member 92 covers the side surfaces of the transmit filter 41 without covering the upper surface of the transmit filter 41.

The resin member 93 covers the major surface 90b and at least one of the circuit components disposed at the major surface 90b. Specifically, the resin member 93 covers the PA control circuit 12, the low-noise amplifier 20, and the switch 30 and the antenna switch 50.

The resin members 92 and 93 function to secure the reliability of mechanical strength, moisture resistance, and other properties of the circuit components disposed at the major surfaces 90a and 90b. The resin members 92 and 93 are made using an insulating resin material. For example, after the circuit components are disposed at the major surface 90a of the module substrate 90, the circuit components and the major surface 90a are entirely sealed with a liquid resin. At this time, the upper surfaces of circuit components (specifically, the transmit filter 41), which are to be exposed later, are also covered with the liquid resin. After the liquid resin is cured, the cured resin is polished. At this time, a portion of the transmit filter 41 can be polished together. As such, the upper surface of the transmit filter 41 and the upper surface of the resin member 92 are made flush with each other. As a result, the coverage of the shielding film 95 can be increased.

The shielding film 95 is a metal thin film that covers the surfaces of the resin member 92. The shielding film 95 is formed by, for example, sputtering. The shielding film 95 continuously covers the upper and side surfaces of the resin member 92, the side surfaces of the module substrate 90, and the side surfaces of the resin member 93.

As described above, because the shielding film 95 is in contact with the upper surface of the transmit filter 41, heat generated in the transmit filter 41 can be efficiently dissipated. The shielding film 95 may be in contact with the side surfaces of the transmit filter 41. The shielding film 95 may be in contact with other circuit components. Specifically, the shielding film 95 may be in contact with the upper or side surface of the power amplifier 10, or the upper or side surface of the transmit filter 42, 43a, or 44a.

Although not illustrated, the shielding film 95 is electrically coupled to a ground electrode layer provided at the module substrate 90. As a result, the shielding film 95 can be set to a ground potential. This configuration reduces the likelihood that external noise interferes with the circuit components included in the radio-frequency module 1A. This configuration also reduces the likelihood that electromagnetic waves that can be generated by the circuit components included in the radio-frequency module 1A affect components other than the radio-frequency module 1A.

Although not illustrated in FIGS. 3A and 3B, multiple post electrodes are provided through the resin member 93. The post electrodes are an example of an external connection terminal included in the radio-frequency module 1A.

For example, the post electrodes include the antenna connection terminal 100, the radio-frequency input terminal 110, the radio-frequency output terminal 120, and the control terminal 130, which are illustrated in FIG. 1, as well as a ground terminal and other terminals. The individual post electrodes can be coupled to terminals including, for example, input-output terminals and/or ground terminals at a mother substrate positioned on the negative side of the z-axis with respect to the radio-frequency module 1A.

3.2 Second Practical Example

Next, a radio-frequency module 1B according to a second practical example will be described with reference to FIGS. 4A and 4B. The following primarily describes features that differ from the first practical example, and descriptions of common features will not be repeated or will be simplified.

Figure 4A:
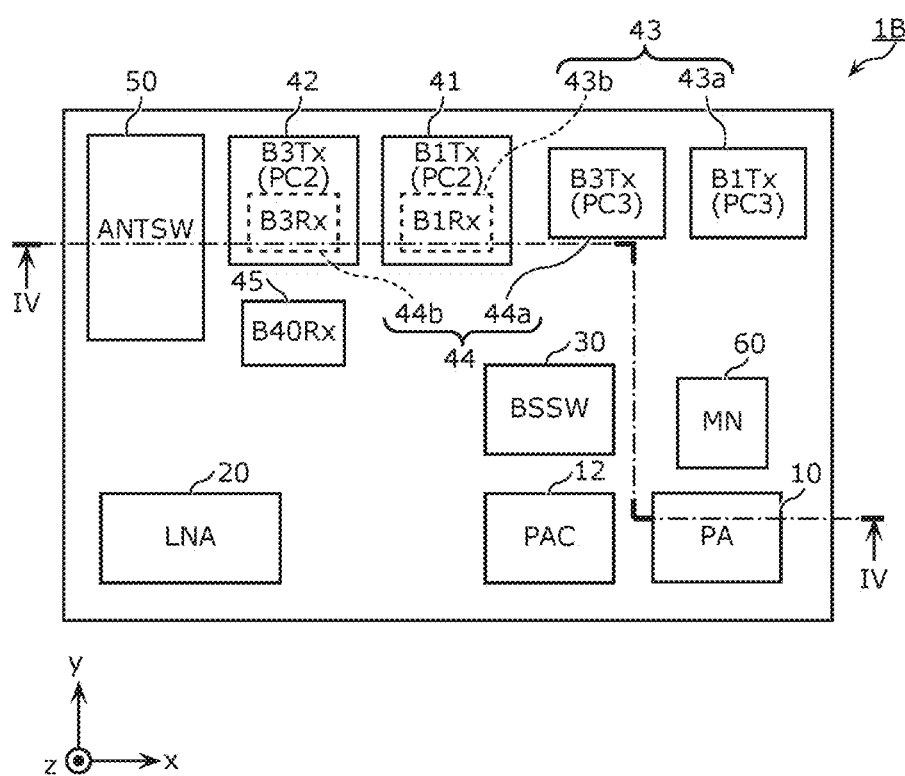
FIG. 4A is a plan view of a radio-frequency module according to a second practical example.
Figure 4B:
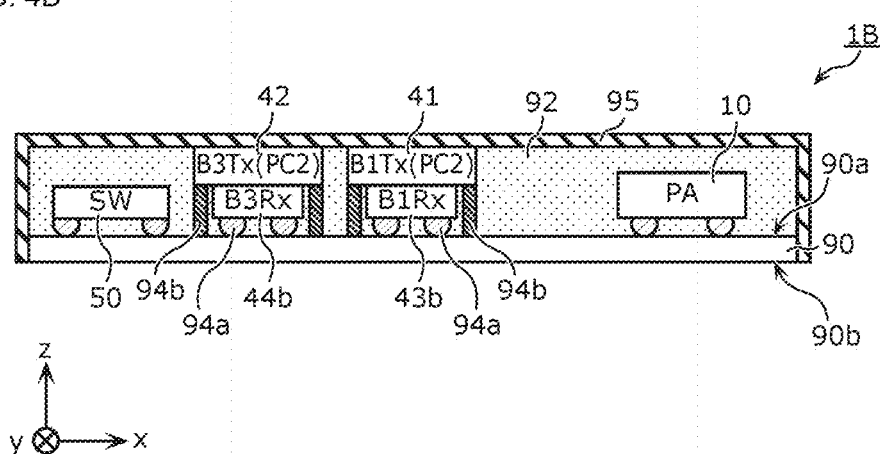
FIG. 4B is a sectional view of the radio-frequency module according to the second practical example.

FIG. 4A is a plan view of the radio-frequency module 1B according to the second practical example, and FIG. 4B is a sectional view of the radio-frequency module 1B according to the second practical example. FIG. 4A illustrates the radio-frequency module 1B when the major surface 90a of the module substrate 90 is viewed from the positive side of the z-axis. In FIG. 4A, a resin member 92, a shielding film 95, and electrodes, and other elements are not illustrated. The circuit components disposed at a major surface 90b of the module substrate 90 and the circuit components disposed between other circuit components and the major surface 90a of the module substrate 90 are illustrated by dashed lines. FIG. 4B illustrates a section (an xz section) that corresponds to segments parallel to the x-axis of line IV-IV in FIG. 4A.

The circuit configuration of the radio-frequency module 1B illustrated in FIGS. 4A and 4B is identical to the circuit configuration of the radio-frequency module 1 illustrated in FIG. 1. The radio-frequency module 1B primarily differs from the radio-frequency module 1A according to the first practical example in that all the circuit components are provided at the major surface 90a of the module substrate 90. This means that in the present practical example, the module substrate 90 is a single-sided mounting board with either the major surface 90a or 90b used as the mounting surface for circuit components.

Specifically, as illustrated in FIG. 4A, the integrated circuits including the power amplifier 10, the PA control circuit 12, the low-noise amplifier 20, the transmit filters 41, 42, 43a, and 44a, the receive filters 43b, 44b, and 45, the matching circuit 60, and the switch 30 and the antenna switch 50 are disposed at the major surface 90a.

Also in the present practical example, the transmit filter 41 and the receive filter 43b are stacked together and positioned beside the major surface 90a. Specifically, the receive filter 43b is positioned between the module substrate 90 and the transmit filter 41. In plan view of the major surface 90a, the distance between the power amplifier 10 and the transmit filter 41 is longer than the distance between the power amplifier 10 and the transmit filter 43a. This configuration reduces the dimensions and minimizes degradation of signal quality and deterioration of the electric power handling capability.

The transmit filter 42 and the receive filter 44b are stacked together and positioned beside the major surface 90a. Specifically, the receive filter 44b is positioned between the module substrate 90 and the transmit filter 42. In plan view of the major surface 90a, the distance between the power amplifier 10 and the transmit filter 42 is longer than the distance between the power amplifier 10 and the transmit filter 44a. This configuration reduces the dimensions and minimizes degradation of signal quality and deterioration of the electric power handling capability.

Both the transmit filters 41 and 42 are in contact with the shielding film 95. Specifically, as illustrated in FIG. 4B, the upper surfaces of the transmit filters 41 and 42 are in contact with the shielding film 95. This configuration enhances the heat dissipation capability, thereby minimizing degradation of signal quality and deterioration of the electric power handling capability.

In the present practical example, to enhance the isolation between transmission and reception, the low-noise amplifier 20 and the receive filter 45 are disposed distant from the power amplifier 10 in plan view of the major surface 90a. For example, when the major surface 90a is divided into two equal regions by a line parallel to the y-axis, the region including the power amplifier 10 (the region on the positive side of the x-axis) and the region including the low-noise amplifier 20 and the receive filter 45 (the region on the negative side of the x-axis) are different. This configuration enhances the isolation between transmission and reception, thereby minimizing degradation of signal quality. Additionally, because the heat generating sources are positioned in a dispersed manner, this configuration further minimizes degradation of signal quality and also reduces deterioration of the electric power handling capability.

3.3 Third Practical Example

Next, a radio-frequency module 1C according to a third practical example will be described with reference to FIGS. 5A and 5B. The following primarily describes features that differ from the first and second practical examples, and descriptions of common features will not be repeated or will be simplified.

Figure 5A:
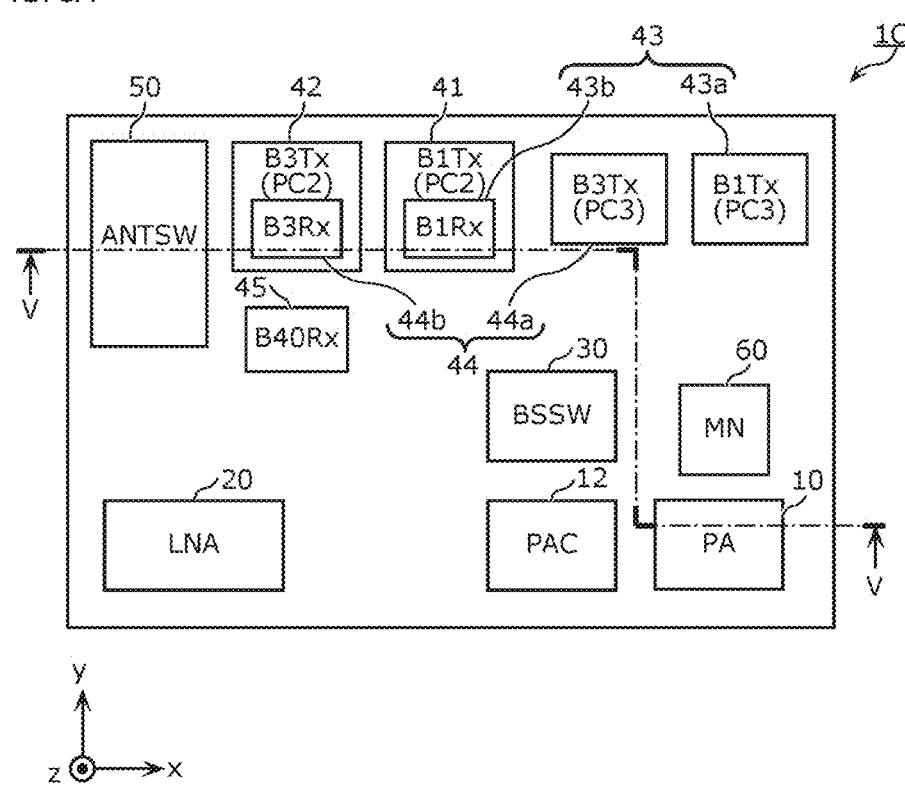
FIG. 5A is a plan view of a radio-frequency module according to a third practical example.
Figure 5B:
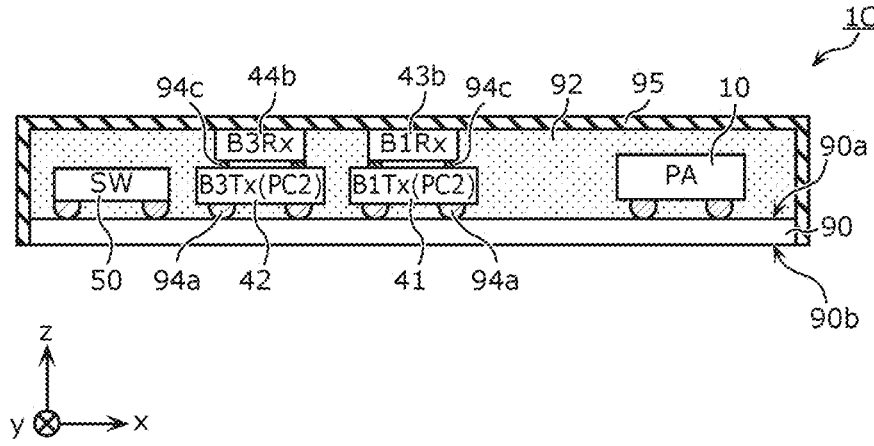
FIG. 5B is a sectional view of the radio-frequency module according to the third practical example.

FIG. 5A is a plan view of the radio-frequency module 1C according to the third practical example, and FIG. 5B is a sectional view of the radio-frequency module 1C according to the third practical example. FIG. 5A illustrates the radio-frequency module 1C when the major surface 90a of the module substrate 90 is viewed from the positive side of the z-axis. In FIG. 5A, a resin member 92, a shielding film 95, and electrodes, and other elements are not illustrated. The circuit components disposed at a major surface 90b of the module substrate 90 and the circuit components disposed between other circuit components and the major surface 90a of the module substrate 90 are illustrated by dashed lines. FIG. 5B illustrates a section (an xz section) that corresponds to segments parallel to the x-axis of line V-V in FIG. 5A.

The circuit configuration of the radio-frequency module 1C illustrated in FIGS. 5A and 5B is identical to the circuit configuration of the radio-frequency module 1 illustrated in FIG. 1. The radio-frequency module 1C differs from the radio-frequency module 1B according to the second practical example in that the positional relationship between the transmit filter 41 and the receive filter 43b is reversed, and the positional relationship between the transmit filter 42 and the receive filter 44b is also reversed.

In the present practical example, the transmit filter 41 is positioned between the receive filter 43b and the module substrate 90. In the present practical example, the transmit filter 41 is electrically coupled to a wire provided at the major surface 90a of the module substrate 90 by bump electrodes 94a. The electrical connection between the transmit filter 41 and the wire at the module substrate 90 is not necessarily provided by the bump electrodes 94a; the electrical connection between the transmit filter 41 and the wire at the module substrate 90 may be provided by, for example, planar electrodes, post electrode, or bonding wires.

The receive filter 43b covers the transmit filter 41. For example, the receive filter 43b is positioned in contact with the upper surface (the surface on the positive side of the z-axis, opposite to the surface facing the module substrate 90) of the transmit filter 41.

In the present practical example, the receive filter 43b is smaller than the transmit filter 41 in plan view of the major surface 90a. As a result, when the receive filter 43b is disposed on the transmit filter 41, the receive filter 43b is positioned within the upper surface of the transmit filter 41 in plan view and does not protrude beyond the upper surface of the transmit filter 41. Thus, the upper surface of the transmit filter 41 is used to provide the electrical connection between the receive filter 43b and the wire provided at the major surface 90a of the module substrate 90.

For example, a redistribution layer is provided at the upper surface of the transmit filter 41. The receive filter 43b is electrically coupled to the redistribution layer by planar electrodes 94c. The receive filter 43b and the redistribution layer may be coupled by bump electrodes or post electrodes. The redistribution layer is electrically coupled to the wire at the module substrate 90 via, for example, bonding wires, wires provided at the side surfaces of the transmit filter 41, or through electrodes provided through the transmit filter 41. In this manner, the receive filter 43b and the wire at the module substrate 90 are electrically coupled using the redistribution layer.

The electrical connection between the receive filter 43b and the wire at the module substrate 90 is not necessarily provided by using the planar electrodes 94c and the redistribution layer. For example, the receive filter 43b may partially protrude beyond the transmit filter 41, and, for example, post electrodes may be coupled to the protruding portion of the receive filter 43b. These post electrodes may be used to provide the electrical connection between the receive filter 43b and the wire at the module substrate 90.

In the present practical example, the transmit filter 41, which generates more heat, is mounted at the major surface 90a of the module substrate 90. As a result, heat can be efficiently dissipated through the module substrate 90. The upper surface of the receive filter 43b is in contact with the shielding film 95. As a result, heat generated in the receive filter 43b can be dissipated using the shielding film 95.

The same applies to the positional relationship between the transmit filter 42 and the receive filter 44b. Specifically, the transmit filter 42 is positioned between the receive filter 44b and the module substrate 90. As a result, heat generated in the transmit filter 42 can be efficiently dissipated through the module substrate 90.

The practical examples described above merely exemplify specific practical examples of the radio-frequency module 1. For example, it may be possible that the resin members 92 and 93 and the shielding film 95 are not provided.

4 Effects

As described above, the radio-frequency module 1, 1A, 1B, or 1C according to the present exemplary embodiment includes the module substrate 90 having the major surfaces 90a and 90b, the transmit filter 41 disposed at the module substrate 90, the duplexer 43 that is disposed at the module substrate 90 and that includes the transmit filter 43a and the receive filter 43b, the antenna switch 50 configured to selectively couple the transmit filter 41 or the duplexer 43, and the switch 30 configured to selectively couple the transmit filter 41 or the transmit filter 43*a*. The transmit filter 41 has a pass band that includes the uplink operating band of the first band for FDD. The transmit filter 43*a* has a pass band that includes the uplink operating band of the first band. The receive filter 43*b* has a pass band that includes the downlink operating band of the first band. The transmit filter 41 and the receive filter 43*b* are stacked together and positioned beside the major surface 90*a*.

Because the transmit filter 41 and the receive filter 43*b* are stacked together, the plane footprint of the transmit filter 41 and the receive filter 43*b* on the major surface 90*a* of the module substrate 90 can be reduced as compared to when the transmit filter 41 and the receive filter 43*b* are not stacked together. This configuration reduces the area of the module substrate 90, thereby reducing the dimensions of the radio-frequency module 1, 1A, 1B, or 1C.

When the transmit filter 41 and the receive filter 43*b* do not simultaneously pass transmit signals or receive signals, there is no concern regarding the isolation between transmit signals and receive signals. This configuration thus minimizes degradation of signal quality. As described above, the present exemplary embodiment implements the radio-frequency module 1, 1A, 1B, or 1C that can improve signal quality while also achieving dimensional reduction.

In an example, the radio-frequency module 1, 1A, 1B, or 1C includes the power amplifier 10 coupled to the transmit filters 41 and 43*a* via the switch 30.

This configuration enables heat dissipation design with consideration for heat generated in the power amplifier 10. For example, the components can be arranged to enhance the heat dissipation capability or minimize the heat impact that the components have on each other. Arranging the components in this manner minimizes the degradation of signal quality and deterioration of the electric power handling capability due to heat influence.

In an example, in plan view of the major surface 90*a*, the distance between the power amplifier 10 and the transmit filter 41 is longer than the distance between the power amplifier 10 and the transmit filter 43*a*.

Because the distance between the power amplifier 10 and the transmit filter 41 is relatively long, this configuration suppresses mutual interference from generated heat, thereby minimizing degradation of signal quality and deterioration of the electric power handling capability.

In an example, the radio-frequency module 1, 1A, 1B, or 1C includes the resin member 92 that covers the transmit filters 41 and 43*a* and the major surface 90*a*, and the shielding film 95 that covers the surfaces of the resin member 92; the transmit filter 41 is in contact with the shielding film 95.

With this configuration, heat generated in the transmit filter 41 can be dissipated through the shielding film 95. Because the heat dissipation capability of the radio-frequency modules 1, 1A, 1B, or 1C is enhanced, this configuration minimizes degradation of signal quality and deterioration of the electric power handling capability.

In an example, the receive filter 43*b* is positioned between the module substrate 90 and the transmit filter 41; the transmit filter 41 has a surface and another surface that is opposite to the surface and that faces the receive filter 43*b*, and the surface of the transmit filter 41 is in contact with the shielding film 95.

This configuration increases the contact area of the transmit filter 41 with the shielding film 95, thereby further enhancing the heat dissipation capability.

In an example, the switch 30 has the common terminal 30*a* coupled to the output end of the power amplifier 10, the selection terminal 30*b* coupled to the input end of the transmit filter 41, and the selection terminal 30*d* coupled to the input end of the transmit filter 43*a*; the antenna switch 50 has the common terminal 50*a* coupled to the antenna 2, the selection terminal 50*b* coupled to the output end of the transmit filter 41, and the selection terminal 50*d* coupled to the output end of the transmit filter 43*a* and the input end of the receive filter 43*b*; when the common terminal 30*a* is connected to the selection terminal 30*b*, the common terminal 50*a* is connected to the selection terminal 50*b* and not to the selection terminal 50*d*.

With this configuration, when the transmit filter 41 passes transmit signals, the receive filter 43*b* does not pass receive signals. This means that the transmit filter 41 can be used in the TDD method. As a result, there is no concern regarding the isolation between transmit signals and receive signals. This configuration thus minimizes degradation of signal quality.

In an example, when the common terminal 30*a* is connected to the selection terminal 30*d*, the common terminal 50*a* is connected to the selection terminal 50*d* and not to the selection terminal 50*b*.

With this configuration, when the transmit filter 41 does not pass transmit signals, the receive filter 43*b* pass receive signals, and the transmit filter 43*a* pass transmit signals. This configuration enables simultaneous transmission and reception using the transmit filter 43*a* and the receive filter 43*b*.

In an example, the transmit filter 41 corresponds to Power Class 2, and the transmit filter 43*a* corresponds to Power Class 3.

This configuration enables transmission and reception of signals of the first band in the HD-FDD method. In the PC2 mode, transmit signals of the first band are transmitted, but signals are not received. As a result, although the transmit filter 41 and the receive filter 43*b* are stacked together, this configuration minimizes degradation of signal quality. In the PC3 mode, simultaneous transmission and reception in the first band can be performed.

In an example, the electric power handling capability of the transmit filter 41 is higher than the electric power handling capability of the transmit filter 43*a*.

This configuration enables the transmit filter 41 to effectively pass signals with relatively high maximum output power, such as the transmit signals amplified in the PC2 mode.

In an example, the size of the transmit filter 41 is larger than the size of the transmit filter 43*a*.

This configuration enables the transmit filter 41 to effectively pass signals with relatively high maximum output power, such as the transmit signals amplified in the PC2 mode.

In an example, the receive filter 43*b* is positioned between the module substrate 90 and the transmit filter 41; and the receive filter 43*b* is smaller than the transmit filter 41 in plan view of the major surface 90*a*.

Because the transmit filter 41 protrudes outward beyond the receive filter 43*b*, the electrical connection between the transmit filter 41 and the wire provided at the major surface 90*a* of the module substrate 90 can be easily made using the protruding portion.

In an example, the radio-frequency module 1, 1A, 1B, or 1C includes the low-noise amplifier 20 coupled to the receive filter 43*b*.

This configuration enables heat dissipation design with consideration for isolation between transmission and reception. For example, the transmit filter 41 and the power amplifier 10 are positioned at relatively long distances from the low-noise amplifier 20. Positioning the transmit filter 41 and the power amplifier 10, and the low-noise amplifier 20 in this manner enhances isolation, thereby minimizing degradation of signal quality.

In an example, in the radio-frequency module LA, the transmit filter 43*a* is disposed at the major surface 90*a*, and the antenna switch 50 and the switch 30 are disposed at the major surface 90*b*.

This configuration allows the circuit components to be disposed separately on both sides of the module substrate 90, thereby reducing the area of the module substrate 90.

In an example, in the radio-frequency module 1B or 1C, the transmit filter 43*a*, the antenna switch 50, and the switch 30 are disposed at the major surface 90*a*.

This configuration allows the circuit components to be disposed together on one side of the module substrate 90, thereby reducing the height of the radio-frequency module 1B or 1C.

In an example, the communication device 4 according to the present exemplary embodiment includes the radio-frequency module 1, 1A, 1B, or 1C, and the RFIC 3 configured to process a radio-frequency signal transferred or to be transferred through the radio-frequency module 1, 1A, 1B, or 1C.

This configuration enables the communication device 4 to improve signal quality while also achieving dimensional reduction.

OTHER EXEMPLARY EMBODIMENTS

The radio-frequency module and the communication device according to an exemplary embodiment of the present disclosure have been described above based on the exemplary embodiment and practical examples. However, the radio-frequency module is not limited to the exemplary embodiment and practical examples. The present disclosure also embraces other exemplary embodiments implemented by any combination of the constituent elements of the exemplary embodiment and practical examples, other modifications obtained by making various modifications to the exemplary embodiment and practical examples that occur to those skilled in the art without departing from the scope of the present disclosure, and various hardware devices including the radio-frequency module.

For example, in the circuit configuration of the radio-frequency module according to the exemplary embodiment and practical examples described above, other circuit elements and/or interconnections may also be inserted in the paths connecting the circuit elements and the signal paths that are illustrated in the drawings.

For example, the third acoustic wave filter may be larger than the first acoustic wave filter in plan view. In this case, when the first acoustic wave filter is stacked on the upper surface of the third acoustic wave filter, the first acoustic wave filter can establish an electrical connection by using, for example, a redistribution layer provided at the upper surface of the third acoustic wave filter. For example, the redistribution layer provided at the upper surface of the third acoustic wave filter can be electrically coupled to a wire at the module substrate via bonding wires, wires provided at the side surface of the third acoustic wave filter, or through electrodes provided through the third acoustic wave filter.

For example, the power classes that correspond to the first acoustic wave filter and the second acoustic wave filter may differ from PC2 and PC3. It is sufficient for the first acoustic wave filter to pass signals with a maximum output power that is greater than the maximum output power of signals passed by the second acoustic wave filter.

For example, the electric power handling capability of the first acoustic wave filter may be equal to or lower than the electric power handling capability of the second acoustic wave filter. It is sufficient for the first acoustic wave filter to pass signals amplified in PC2 mode. The same applies to the size and the number of resonators. For example, the size of the first acoustic wave filter may be equal to or smaller than the size of the second acoustic wave filter.

The present disclosure may also be embodied in other forms that can be achieved by applying various modifications to the above-described exemplary embodiments that occur to those skilled in the art, or by combining the constituent elements and functions in the exemplary embodiments in any manner without departing from the spirit and scope of the present disclosure.

The following describes the features of the radio-frequency module and the communication device explained based on the exemplary embodiment.

<1>

A radio-frequency module comprising:

a module substrate including a first major surface and a second major surface, the second major surface being opposite to the first major surface;

a first acoustic wave filter disposed at the module substrate;

a duplexer disposed at the module substrate, the duplexer including a second acoustic wave filter and a third acoustic wave filter;

an antenna switch configured to switch between a connection to the first acoustic wave filter and a connection to the duplexer; and a transmit switch configured to selectively couple the first acoustic wave filter or the second acoustic wave filter, wherein the first acoustic wave filter includes a pass band that includes an uplink operating band of a first band for frequency division duplex (FDD), the second acoustic wave filter includes a pass band that includes the uplink operating band of the first band, the third acoustic wave filter includes a pass band that includes a downlink operating band of the first band, and the first acoustic wave filter and the third acoustic wave filter are stacked together and positioned beside the first major surface.

<2>

The radio-frequency module according to <1>, further comprising a power amplifier coupled to the first acoustic wave filter and the second acoustic wave filter via the transmit switch.

<3>

The radio-frequency module according to <1> or <2>, wherein in plan view of the first major surface, a distance between the power amplifier and the first acoustic wave filter is longer than a distance between the power amplifier and the second acoustic wave filter.

<4>

The radio-frequency module according to any one of <1> to <3>, further comprising:

a resin member that covers the first acoustic wave filter, the third acoustic wave filter, and the first major surface; and a shielding film that covers a surface of the resin member, wherein the first acoustic wave filter is in contact with the shielding film.

<5>

The radio-frequency module according to <4>, wherein the third acoustic wave filter is positioned between the module substrate and the first acoustic wave filter, and the first acoustic wave filter includes a surface and another surface that is opposite to the surface and that faces the third acoustic wave filter, and the surface of the first acoustic wave filter is in contact with the shielding film.

<6>

The radio-frequency module according to <2> or <3>, wherein the transmit switch includes a first common terminal coupled to an output end of the power amplifier, a first selection terminal coupled to an input end of the first acoustic wave filter, and a second selection terminal coupled to an input end of the second acoustic wave filter, the antenna switch includes a second common terminal coupled to an antenna, a third selection terminal coupled to an output end of the first acoustic wave filter, and a fourth selection terminal coupled to an output end of the second acoustic wave filter and an input end of the third acoustic wave filter, and in a case that the first common terminal is connected to the first selection terminal, the second common terminal is connected to the third selection terminal and not to the fourth selection terminal.

<7>

The radio-frequency module according to <6>, wherein, in a case that the first common terminal is connected to the second selection terminal, the second common terminal is connected to the fourth selection terminal and not to the third selection terminal.

<8>

The radio-frequency module according to any one of <1> to <7>, wherein the first acoustic wave filter corresponds to Power Class 2, and the second acoustic wave filter corresponds to Power Class 3.

<9>

The radio-frequency module according to any one of <1> to <8>, wherein an electric power handling capability of the first acoustic wave filter is higher than an electric power handling capability of the second acoustic wave filter.

<10>

The radio-frequency module according to any one of <1> to <9>, wherein a size of the first acoustic wave filter is larger than a size of the second acoustic wave filter.

<11>

The radio-frequency module according to any one of <1> to <10>, wherein the third acoustic wave filter is positioned between the module substrate and the first acoustic wave filter, and the third acoustic wave filter is smaller than the first acoustic wave filter in plan view of the first major surface.

<12>

The radio-frequency module according to any one of <1> to <11>, further comprising:

a low-noise amplifier coupled to the third acoustic wave filter.

<13>

The radio-frequency module according to any one of <1> to <12>, wherein the second acoustic wave filter is disposed at the first major surface, and the antenna switch and the transmit switch are disposed at the second major surface.

<14>

The radio-frequency module according to any one of <1> to <13>, wherein the second acoustic wave filter, the antenna switch, and the transmit switch are disposed at the first major surface.

<15>

The radio-frequency module according to any one of <1> to <14>, wherein the module substrate includes a low temperature co-fired ceramic (LTCC) substrate.

<16>

The radio-frequency module according to any one of <1> to <14>, wherein the module substrate includes a high temperature co-fired ceramic (HTCC) substrate.

<17>

The radio-frequency module according to any one of <1> to <14>, wherein the module substrate includes a redistribution layer.

<18>

The radio-frequency module according to any one of <1> to <17>, wherein at least one of the first, second, and third acoustic wave filters include a surface acoustic wave (SAW) filter.

<19>

The radio-frequency module according to any one of <1> to <17>, wherein at least one of the first, second, and third acoustic wave filters includes a bulk acoustic wave (BAW) filter.

<20>

A communication device comprising:

the radio-frequency module according to any one of <1> to <19>; and a signal processing circuit configured to process a radio-frequency signal transferred or to be transferred through the radio-frequency module.

The present disclosure can be used as a radio-frequency module provided at the front-end that supports multiple bands, in a wide variety of communication devices such as mobile phones.

What is claimed is:

1. A radio-frequency module comprising:

a module substrate including a first major surface and a second major surface, the second major surface being opposite to the first major surface;

a first acoustic wave filter disposed at the module substrate;

a duplexer disposed at the module substrate, the duplexer including a second acoustic wave filter and a third acoustic wave filter;

an antenna switch configured to selectively couple the first acoustic wave filter or the duplexer; and a transmit switch configured to selectively couple the first acoustic wave filter or the second acoustic wave filter, wherein the first acoustic wave filter includes a pass band that includes an uplink operating band of a first band for frequency division duplex (FDD), the second acoustic wave filter includes a pass band that includes the uplink operating band of the first band, the third acoustic wave filter includes a pass band that includes a downlink operating band of the first band, and the first acoustic wave filter and the third acoustic wave filter are stacked one on top of the other and positioned beside the first major surface.

2. The radio-frequency module according to claim 1, further comprising:

a power amplifier coupled to the first acoustic wave filter and the second acoustic wave filter via the transmit switch.

3. The radio-frequency module according to claim 2, wherein in plan view of the first major surface, a distance between the power amplifier and the first acoustic wave filter is longer than a distance between the power amplifier and the second acoustic wave filter.

4. The radio-frequency module according to claim 1, further comprising:

a resin member that covers the first acoustic wave filter, the third acoustic wave filter, and the first major surface; and a shielding film that covers a surface of the resin member, wherein the first acoustic wave filter is in contact with the shielding film.

5. The radio-frequency module according to claim 4, wherein the third acoustic wave filter is positioned between the module substrate and the first acoustic wave filter, and the first acoustic wave filter includes a surface and another surface that is opposite to the surface and that faces the third acoustic wave filter, and the surface of the first acoustic wave filter is in contact with the shielding film.

6. The radio-frequency module according to claim 2, wherein the transmit switch includes a first common terminal coupled to an output end of the power amplifier, a first selection terminal coupled to an input end of the first acoustic wave filter, and a second selection terminal coupled to an input end of the second acoustic wave filter, the antenna switch includes a second common terminal coupled to an antenna, a third selection terminal coupled to an output end of the first acoustic wave filter, and a fourth selection terminal coupled to an output end of the second acoustic wave filter and an input end of the third acoustic wave filter, and in a case that the first common terminal is connected to the first selection terminal, the second common terminal is connected to the third selection terminal and not to the fourth selection terminal.

7. The radio-frequency module according to claim 6, wherein, in a case that the first common terminal is connected to the second selection terminal, the second common terminal is connected to the fourth selection terminal and not to the third selection terminal.

8. The radio-frequency module according to claim 1, wherein the first acoustic wave filter corresponds to Power Class 2, and the second acoustic wave filter corresponds to Power Class 3.

9. The radio-frequency module according to claim 1, wherein an electric power handling capability of the first acoustic wave filter is higher than an electric power handling capability of the second acoustic wave filter.

10. The radio-frequency module according to claim 1, wherein a size of the first acoustic wave filter is larger than a size of the second acoustic wave filter.

11. The radio-frequency module according to claim 1, wherein the third acoustic wave filter is positioned between the module substrate and the first acoustic wave filter, and the third acoustic wave filter is smaller than the first acoustic wave filter in plan view of the first major surface.

12. The radio-frequency module according to claim 1, further comprising:

a low-noise amplifier coupled to the third acoustic wave filter.

13. The radio-frequency module according to claim 1, wherein the second acoustic wave filter is disposed at the first major surface, and the antenna switch and the transmit switch are disposed at the second major surface.

14. The radio-frequency module according to claim 1, wherein the second acoustic wave filter, the antenna switch, and the transmit switch are disposed at the first major surface.

15. The radio-frequency module according to claim 1, wherein the module substrate includes a low temperature co-fired ceramic (LTCC) substrate.

16. The radio-frequency module according to claim 1, wherein the module substrate includes a high temperature co-fired ceramic (HTCC) substrate.

17. The radio-frequency module according to claim 1, wherein the module substrate includes a redistribution layer.

18. The radio-frequency module according to claim 1, wherein at least one of the first, second, and third acoustic wave filters include a surface acoustic wave (SAW) filter.

19. The radio-frequency module according to claim 1, wherein at least one of the first, second, and third acoustic wave filters includes a bulk acoustic wave (BAW) filter.

20. A communication device comprising:

the radio-frequency module according to claim 1; and a signal processing circuit configured to process a radio-frequency signal transferred or to be transferred through the radio-frequency module.

* * * * *